Figure 1:
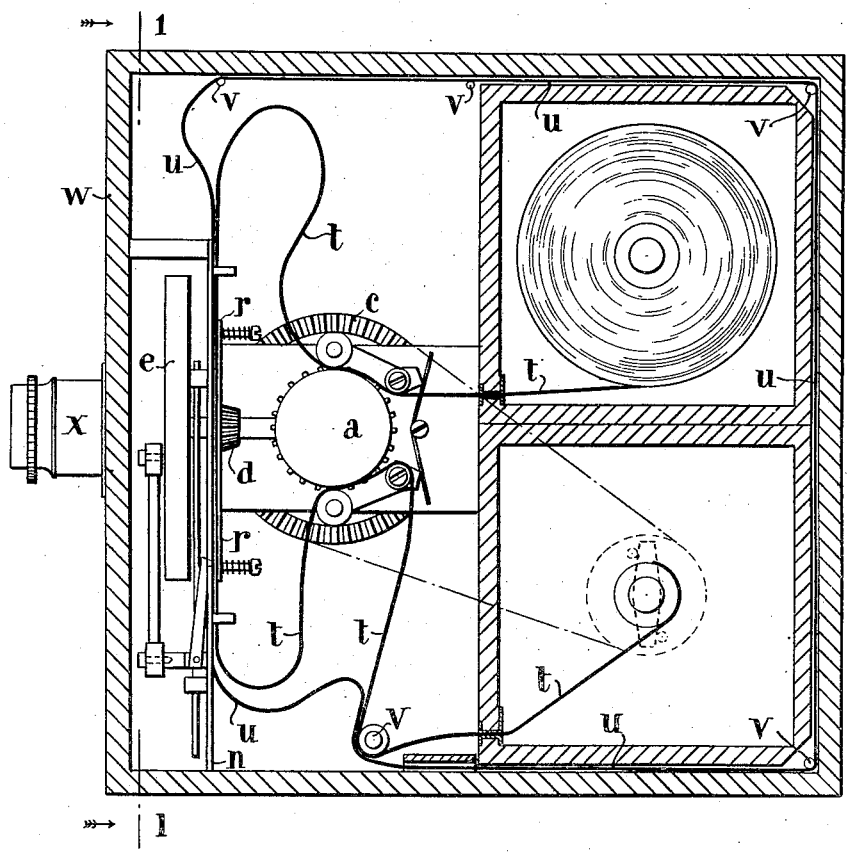

W. FRIESE-GREENE.
KINEMATOGRAPHIC APPARATUS.
APPLICATION FILED AUG. 21, 1908.

937,367.

Patented Oct. 19, 1909.
2 SHEETS—SHEET 1.

WITNESSES:

INVENTOR:
William Friese-Greene
By Attorneys,

W. FRIESE-GREENE.
KINEMATOGRAPHIC APPARATUS.
APPLICATION FILED AUG. 21, 1908.
937,367.
Patented Oct. 19, 1909.
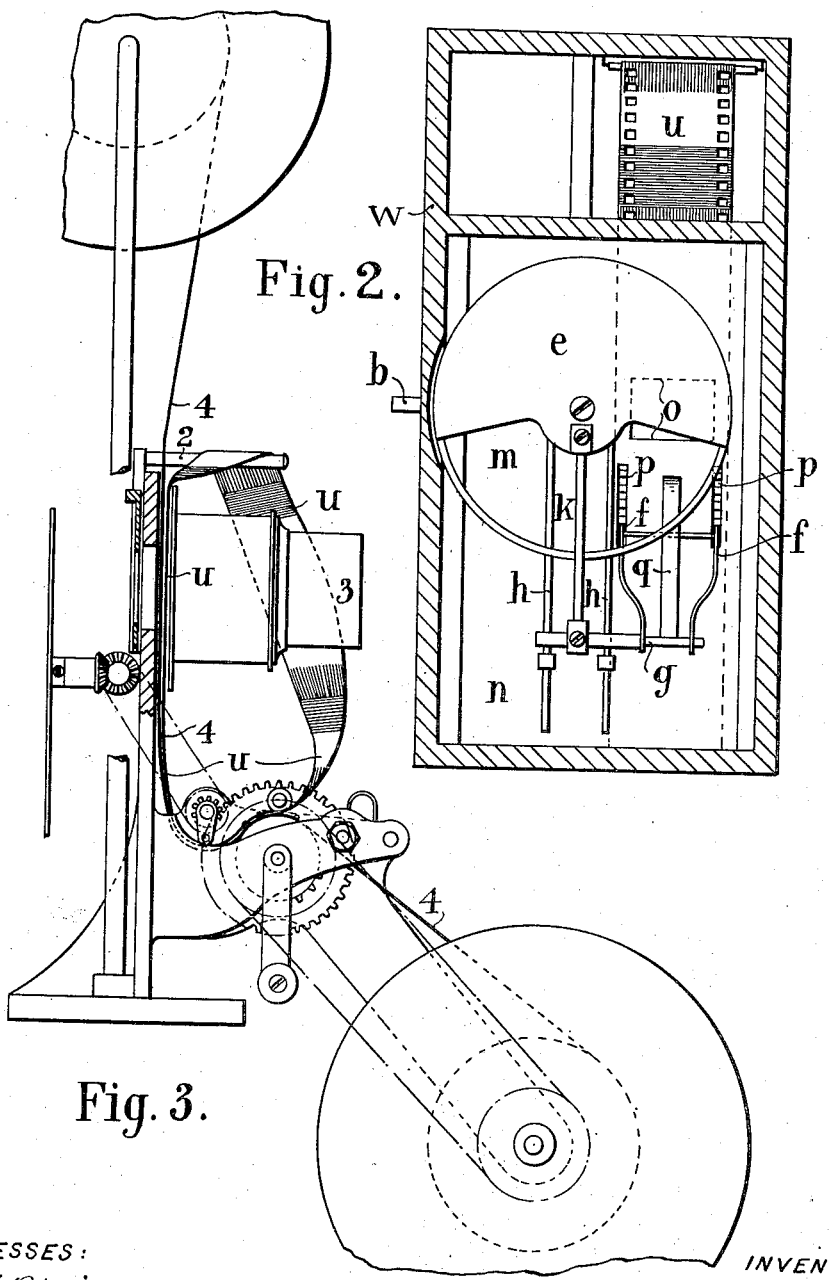

UNITED STATES PATENT OFFICE.

WILLIAM FRIESE-GREENE, OF BRIGHTON, ENGLAND.

KINEMATOGRAPHIC APPARATUS.

937,367.     Specification of Letters Patent.     Patented Oct. 19, 1909.

Application filed August 21, 1908.  Serial No. 449,703.

*To all whom it may concern:*

Be it known that I, WILLIAM FRIESE-GREENE, of 203 Western road, Brighton, in the county of Sussex, England, photographer, have invented certain new and useful Improvements in and Relating to Kinematographic Apparatus, of which the following is a specification.

This invention has reference to improvements in the taking and projecting of animated pictures in natural colors upon a screen.

According to this invention, when taking a series of animated pictures, a translucent screen-band or color-filter divided into successive series of primary colors is disposed between an orthochromatically sensitized film and the camera lens, said screen-band being located in close contact with the sensitized film opposite the lens, and being intermittently traveled in conjunction with the film between each period of exposure in such manner that successive exposures are effected through successive primary color divisions. The translucent film or screen may either be continuous or it may consist of a suitable length of film wound from one spool on to another, and each series of color divisions thereon is composed of the three primary colors—red, green, and blue-violet. The extent of each individual color division is equal to the area of the sensitized film affected during an exposure.

In order to reproduce animated pictures in the natural colors, transparencies or positives of the subjects are produced from the sensitized film in the usual manner, and the aforesaid color screen is interposed between the film provided with photographs and the screen upon which the images are projected, care being taken that it is located in close contact with the picture film when opposite the lens. The screen band is adapted to be traveled synchronously with the positive film and so that the color divisions occupy the same positions relatively to the positive film as they occupied when the negative was taken.

When it is desired to take stereoscopic negatives, or to reproduce stereoscopic effects, a colored screen is used with each lens, the screens being preferably so arranged that the primary colors of the two screens do not correspond at any one exposure. Or, instead of bearing the aforesaid series of primary colors, the screen of one lens may be colored with alternate divisions of red and green, while the screen of the other lens is divided alternately into divisions of yellow and blue. In this case two lenses are employed for taking and for projecting the images; when projected, the two images, which have been taken simultaneously, are super-imposed. When two images are produced side by side upon a film by means of prisms, the color screen may be divided longitudinally into two adjacent series of color divisions, either into two adjacent series of primary colors, such as red, green and blue, so arranged that adjacent color divisions do not correspond; or into two adjacent series of color divisions, whereof the one consists of the colors red and green alternately, and the other consists of the colors yellow and blue alternately. In this case the images can be taken and projected with one lens. In all cases the flexible translucent screen band must be in close contact with the film at the point of exposure or projection.

In the accompanying drawings Figures 1 and 2 illustrate the method of applying the invention to a camera employed for taking so-called animated pictures, and Fig. 3 the application of the invention to projection apparatus. Fig. 1 is a sectional side elevation of the camera and Fig. 2 is a cross section on line 1, 1, Fig. 1 showing the shutter and the intermittent feed mechanism. Fig. 3 is a sectional elevation of the feed mechanism.

Referring to the drawings, the continuous feed mechanism employed for traveling the sensitized film is of the type usually employed in apparatus of this description, and comprises a toothed drum $a$, carried upon a hand-operated shaft $b$, to which also is keyed a toothed wheel $c$, meshing with a pinion $d$, fast upon the shaft carrying the revolving shutter $e$. The intermittent feed mechanism is also such as is usually employed, and comprises claws $f f$ mounted upon a cross-head $g$, carried by guide rods $h\ h$, said cross-head $g$ being connected by rod $k$ to a pin $m$ on the shutter $e$. Said intermittent feed mechanism is carried upon a plate $n$ provided with an exposure aperture $o$, and with grooves $p\ p$, along which the claws $f f$ are adapted to be reciprocated, and through which they are pressed during a certain portion of their travel by a spring $q$; $r$ is a presser plate yieldingly held upon the plate n and provided with grooves corresponding with the grooves p p; a belt s serves to rotate a spool to receive the film bearing the pictures; t is the sensitized film which is passed over the toothed drum a as shown, whence it passes between the presser plate r and the plate n and back on to the toothed drum a; thence the film passes to a receiving spool; u is the translucent film or color screen consisting of an endless band divided into successive series of the primary colors red, green, and blue-violet, and adapted to pass beneath the presser plate r and between the sensitized film t and the plate n, the color screen thus being disposed between the lens and the sensitized film as near as practicable in the plane of the image. The endless color screen is passed over loose rollers v, v, v, v. A casing w incloses the aforesaid apparatus and is provided with a lens x.

In operation the sensitized film t and the color screen u are simultaneously and intermittently fed forward between successive exposures through a distance corresponding to one color division on the color screen, this intermittent movement being effected by means of the reciprocating claws f f, which engage corresponding marginal slots in the color screen and sensitized film. In this manner a series of exposures is effected through the successive series of color divisions of the color screen.

In Fig. 3 the position of the translucent film or color screen u is shown passing over a pillar or arm 2 and out of the way of the lens 3; 4 is the film provided with photographs.

Although for the sake of example the invention has been described with reference to two forms of apparatus, it is to be understood it may equally well be applied to any of the apparatus usually employed for taking or reproducing animated pictures. Further, a negative having been produced in the manner set forth, positives may be obtained therefrom in any well-known manner.

In projection apparatus it may in some cases be desirable to travel the translucent film continuously instead of intermittently, in which case the extent of each color division upon said film would be so arranged that each exposure is effected through a different color division.

What I claim and desire to secure by Letters Patent is:—

1. In kinematographic apparatus the combination with means for intermittently advancing and exposing the film, of a translucent color screen divided into successive series of primary color divisions, and adapted to be engaged by said means whereby it is held stationary opposite the lens during the periods of exposure, substantially as described.

2. In kinematographic apparatus the combination with a lens and means for intermittently advancing and exposing the film, of a flexible translucent screen band divided into successive series of primary color divisions, said screen band being located close to the film opposite the lens and said screen band being caused to travel with said film opposite the lens, substantially as described.

3. In a kinematographic apparatus the combination with a lens and means for intermittently advancing and exposing the film, of a flexible translucent screen band divided into successive series of primary color divisions, said screen band being located in close contact with the film opposite the lens and engaged by said means whereby the film and screen band are caused to travel in contact opposite the lens, substantially as described.

4. In a kinematographic apparatus, the combination with a lens and means for intermittently advancing and exposing the film, of a flexible translucent screen band, divided into successive series of primary color divisions, one for each picture, said screen band being located in close contact with the film opposite the lens, and engaged by said means, whereby the film and screen band are caused to travel together intermittently and synchronously and in contact opposite the lens, substantially as and for the purpose described.

5. In kinematographic projecting apparatus the combination with a lens and means for intermittently advancing and exposing the film bearing the pictures, of a flexible translucent screen band, divided into successive series of primary colors, said screen band being located close to the film opposite the lens, and said screen band being caused to travel with said film opposite the lens, substantially as and for the purpose set forth.

6. In kinematographic projecting apparatus, the combination with the lens, of a flexible translucent screen band, divided into successive series of primary color divisions, one for each picture, said screen band being located in close contact opposite the lens with the film bearing the pictures, and means whereby the film and screen band are caused to travel together intermittently and synchronously and in contact opposite the lens, substantially as and for the purpose described.

7. In kinematographic apparatus, the combination with means for intermittently advancing the film, of a translucent color screen divided into successive series of primary color divisions, and adapted to be engaged by said means, substantially as and for the purpose set forth.

8. In kinematographic apparatus, a flexible translucent screen band, divided into successive series of primary color divisions and means for moving it through the apparatus in close contact with the film in the position of exposure, substantially as and for the purpose set forth.

9. In kinematographic apparatus a flexible translucent screen band, divided into successive series of red, green and blue-violet divisions, and means for moving it through the apparatus in close contact with the film, substantially as and for the purpose set forth.

In witness whereof, I have hereunto signed my name in the presence of two subscribing witnesses.

WILLIAM FRIESE-GREENE.

Witnesses:
ARTHUR SINCLAIR FLEMING MORRIS,
ROBERT MILTON SPEARPOINT.